United States Patent [19]
Chang

[11] Patent Number: 6,106,652
[45] Date of Patent: *Aug. 22, 2000

[54] METHOD FOR MAKING DECAL AND THE MANUFACTURE

[76] Inventor: Wei-Yin Chang, No. 14-1, Hsin-Te Rd., Hou Li Hsiang, Taichung Hsien, Taiwan

[ * ] Notice: This patent issued on a continued prosecution application filed under 37 CFR 1.53(d), and is subject to the twenty year patent term provisions of 35 U.S.C. 154(a)(2).

[21] Appl. No.: 09/115,940

[22] Filed: Jul. 15, 1998

[51] Int. Cl.$^7$ ............................. B32B 31/00; B29D 9/00
[52] U.S. Cl. ..................... 156/256; 156/277; 156/278; 264/246; 264/268; 428/192; 428/913.3; 40/636; 493/961; 427/288; 427/289; 427/290; 427/292; 427/398.1
[58] Field of Search .................................. 428/195, 41.8, 428/42.1, 192, 66.5, 66.7, 187, 913.3; 156/277, DIG. 43, 307.1, 256, 62, 267, 278; 40/636; 264/246, 268

[56] References Cited

U.S. PATENT DOCUMENTS

| | | | |
|---|---|---|---|
| 2,143,141 | 10/1939 | Cooley | 428/66.5 |
| 3,953,932 | 5/1976 | Graves | 40/27.5 |
| 4,481,160 | 11/1984 | Bree | 264/135 |

*Primary Examiner*—Richard Crispino
*Assistant Examiner*—Linda L. Gray
*Attorney, Agent, or Firm*—Rosenberg, Klein & Lee

[57] ABSTRACT

A method for making a decal structure includes the steps of: (a) providing a base paper having a top face and a bottom face; (b) printing a pattern on the top face of the base paper; (c) providing a looped spacing polymeric coating on the top face of the base paper around the pattern; (d) cutting the base paper into a dimension slightly greater than that of the looped spacing polymeric coating; (e) infusing a polyester into the looped spacing polymeric coating so as to form a transparent outer layer covering the pattern in the looped spacing polymeric coating (22); and (f) cooling the polyester to cure so as to form a final decal structure, wherein the decal structure includes a base paper having a top face and a bottom face, a pattern printed on the top face of the base paper, a looped spacing polymeric coating coated on the top face of the base paper around the pattern and having an inner edge and an outer edge, and a transparent outer layer mounted in the inner edge of the looped spacing polymeric coating and covering the pattern.

5 Claims, 4 Drawing Sheets

METHOD FOR MAKING DECAL AND THE MANUFACTURE

BACKGROUND OF THE INVENTION

1. Field of the Invention

The present invention relates to a method for making a decal structure and the manufacture thereof.

2. Description of the Related Prior Art

A first conventional method for making a decal structure is to integrally form a rubber pad 50 as shown in FIG. 1 which contains a figure, a character or the like therein and can be sewn on an object 56 such a clothing, a shoe or the like by means of stitches 52. However, the rubber pad 50 cannot be easily sewn on the object 56 due to it having a greater depth, thereby causing inconvenience during the sewing process.

A second conventional method for making a decal structure is shown in FIGS. 2 and 3, and comprises the following steps:

(a) providing a base paper 10 including a top face and a bottom face coated with an adhesive;

(b) printing a pattern 11 on the top face of the base paper 10, wherein the pattern 11 includes a character, a figure or the like;

(c) cutting the base paper 10 into a required shape;

(d) depositing a predetermined amount of polyester onto the base paper 10 so as to form a transparent outer layer 12 covering the pattern 11, wherein the polyester can be adhered onto the base paper 10 by means of its internal aggregation force (inherent inner tension of the polyester) without a possibility of overflowing outside of the base paper 10; and (e) cooling the polyester to cure so as to form a final decal structure on the base paper 10 as shown in FIG. 2.

The decal structure can be sewn on an object 16 such as the clothing, the shoe or the like by means of stitches 13. However, the stitches 13 is not easy to extend through the transparent outer layer 12 and the base paper 10 into the object 16, thereby increasing the difficulty for sewing the decal structure.

The present invention has arisen to overcome the disadvantage of the conventional decal structure and the method for making it.

SUMMARY OF THE INVENTION

The primary objective of the present invention is to provide a method for making a decal structure which can be easily and tightly sewn on an object.

According to one aspect of the present invention, there is provided a method for making a decal structure comprising the steps of: (a) providing a base paper having a top face and a bottom face coated with an adhesive; (b) printing a pattern including a character, a figure or the like on the top face of the base paper; (c) providing a looped spacing polymeric coating on the top face of the base paper around the pattern, wherein the looped spacing polymeric coating includes silicon mixed with one percent of curing agent; (d) cutting the base paper into a dimension slightly greater than that of the looped spacing polymeric coating; (e) depositing a polyester into the looped spacing polymeric coating so as to form a transparent outer layer covering the pattern in the looped spacing polymeric coating (22); and (f) cooling the polyester to cure so as to form a final decal structure.

According to another aspect of the present invention, there is provided a decal structure comprising a base paper having a top face and a bottom face, a pattern printed on the top face of the base paper, a looped spacing polymeric coating coated on the top face of the base paper around the pattern and having an inner edge and an outer edge, and a transparent outer layer mounted in the inner edge of the looped spacing polymeric coating and covering the pattern.

Further objectives and advantages of the present invention will become apparent after a careful reading of the detailed description with appropriate reference to the accompanying drawings.

DETAILED DESCRIPTION OF THE PREFERRED EMBODIMENTS

Figure 1:
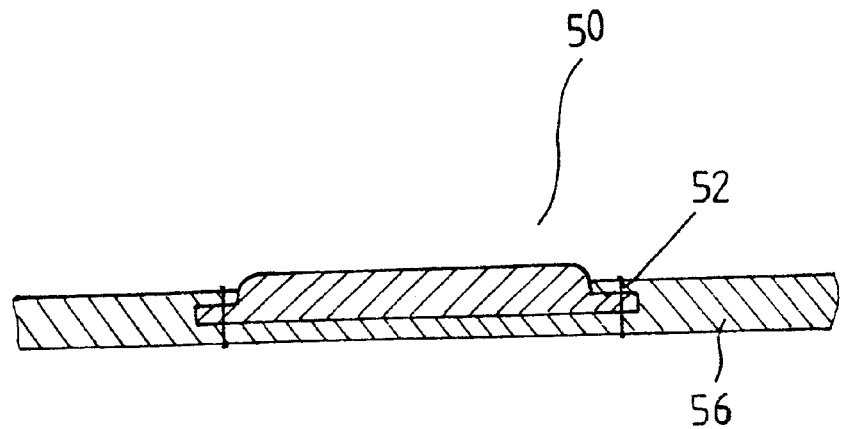
FIG. 1 is a front plan cross-sectional view of a first conventional decal structure according to the prior art.
Figure 2:
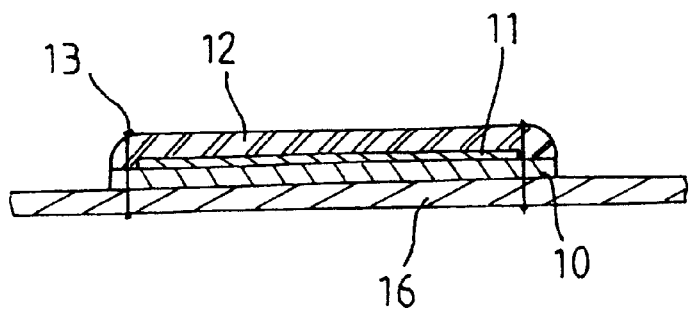
FIG. 2 is a front plan cross-sectional view of a second conventional decal structure according to the prior art.
Figure 3:
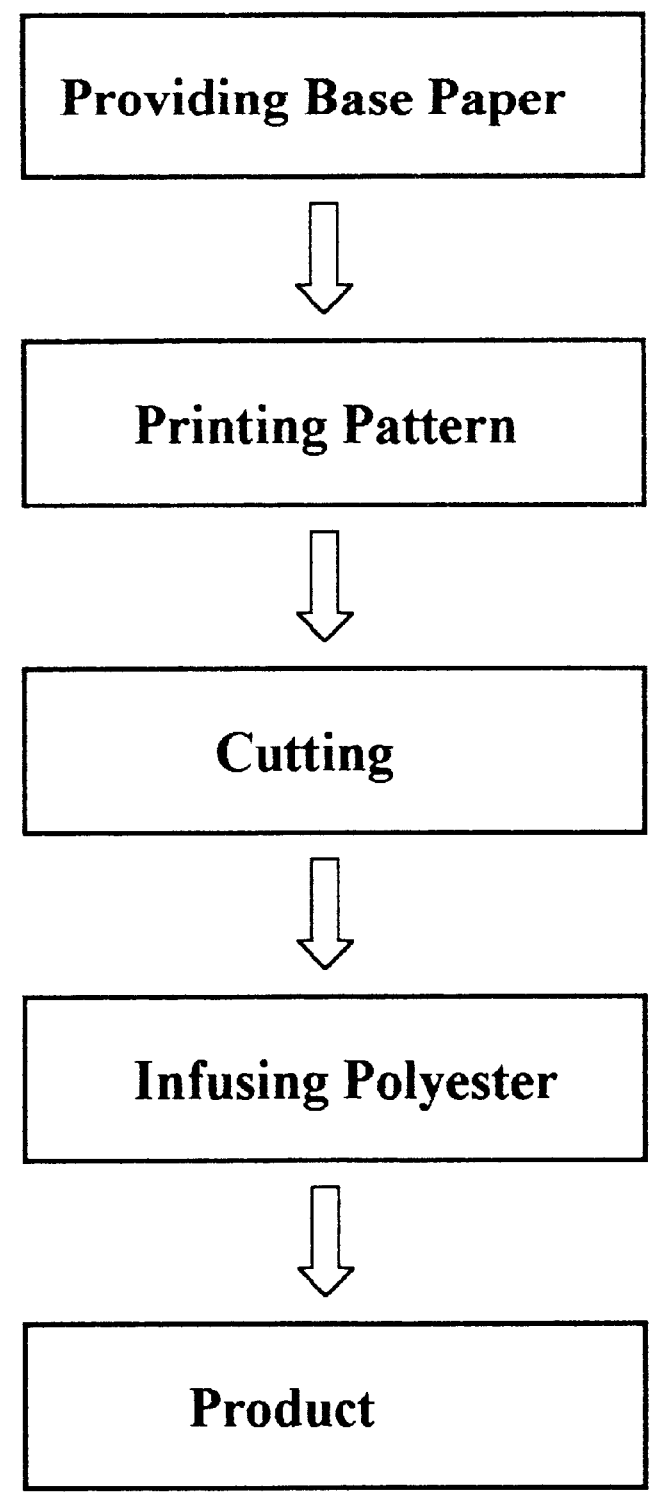
FIG. 3 is a flow chart of a conventional method for making the conventional decal structure as shown in FIG. 2.
Figure 4:
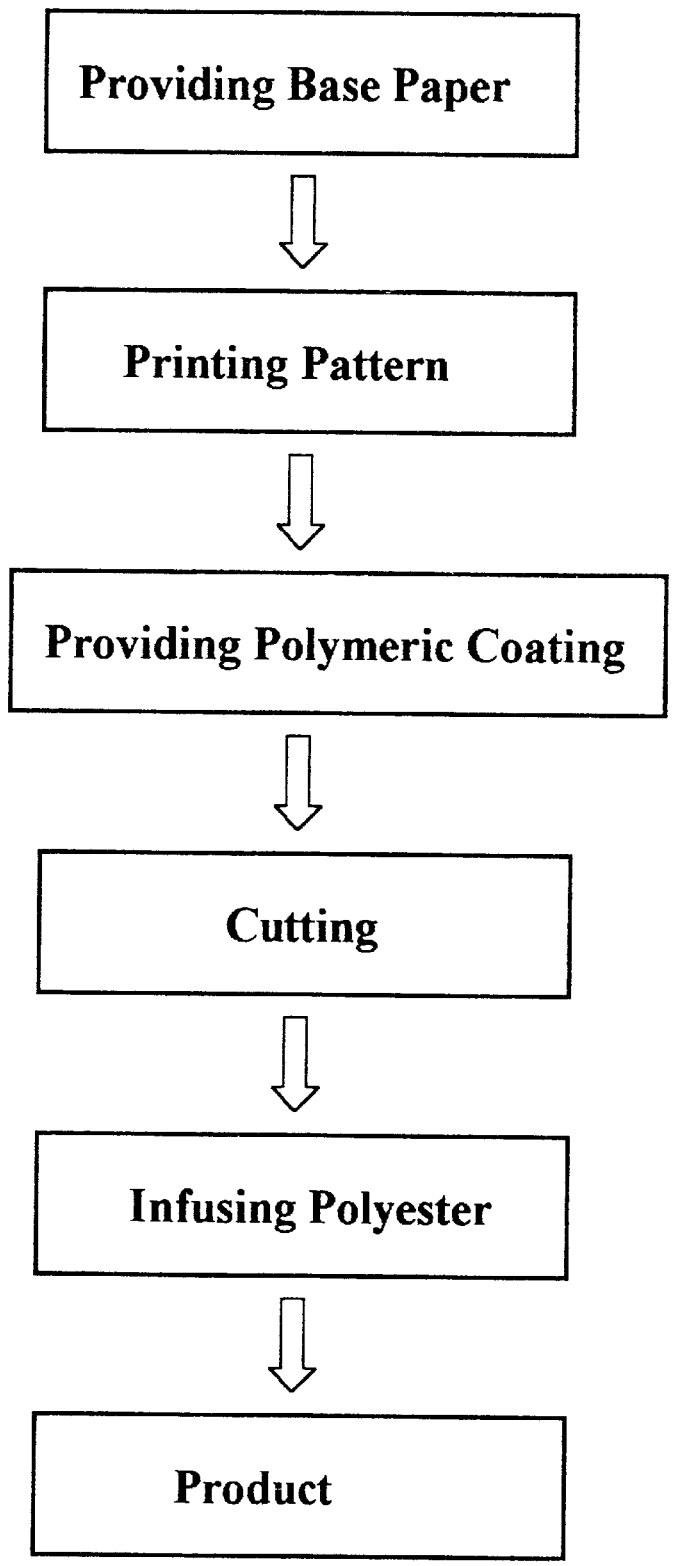
FIG. 4 is a method for making a decal structure according to the present invention.
Figure 5:
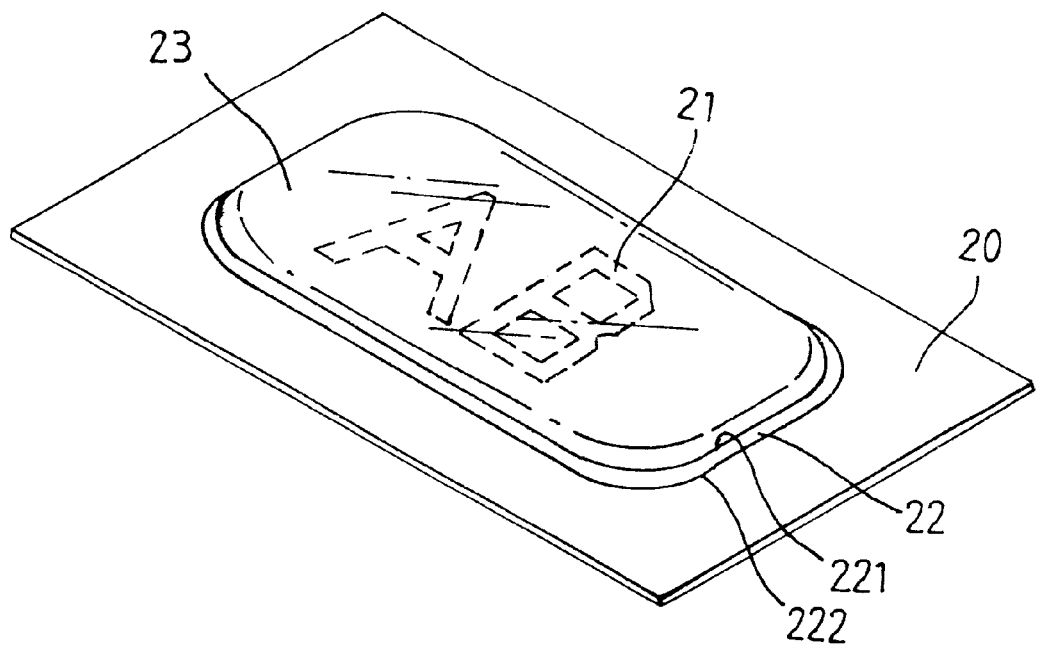
FIG. 5 is a perspective view of the decal structure according to the present invention.
Figure 6:
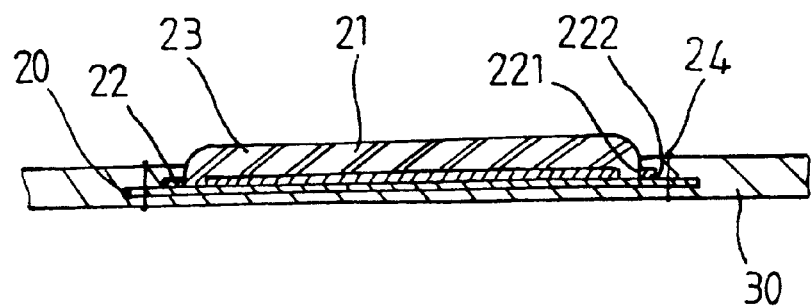
FIG. 6 is a front plan cross-sectional view of the decal structure as shown in FIG. 5.

Referring now to FIGS. 4–6, a method according to the present invention can be adapted for making a decal structure and comprises the following steps:

(a) providing a base paper 20 which includes a top face and a bottom face coated with an adhesive;

(b) printing a pattern 21 on the top face of the base paper 20, wherein the pattern 21 includes a character, a figure or the like;

(c) providing a looped spacing polymeric coating 22 on the top face of the base paper 20 around the pattern 21, wherein the looped spacing polymeric coating 22 includes silicon mixed with one percent (1%) of curing agent so as to dry and cure the polymeric coating 22 quickly;

(d) cutting the base paper 20 into a shape whose dimension is slightly greater than that of the looped spacing polymeric coating 22;

(e) depositing a predetermined amount of polyester into the looped spacing polymeric coating 22 so as to form a transparent outer layer 23 covering the pattern 21 in the looped spacing polymeric coating 22, wherein the surface tension of the polyester is greater than that of the looped spacing polymeric coating 22 such that the transparent outer layer 23 made of the polyester can be limited in the inner edge 221 of the looped spacing polymeric coating 22 to form a depth without a possibility of overflowing outside of the outer edge 222 of the looped spacing polymeric coating 22; and (f) cooling the polyester to cure so as to form a final decal structure on the base paper 20 as shown in FIG. 5.

A decal structure according to the present invention comprises a base paper having a top face and a bottom face coated with an adhesive, a pattern 21 including a character, a figure or the like printed on the top face of the base paper 20, a looped spacing polymeric coating 22 including silicon mixed with one percent of curing agent being coated on the top face of the base paper 20 around the pattern 21 and having an inner edge 221 and an outer edge 222, and a transparent outer layer 23 made of a polyester mounted in the inner edge 221 of the looped spacing polymeric coating 22 and covering the pattern 21.

In such a manner, the decal structure according to the present invention can be mounted on an object 30 such as a clothing, a shoe or the like by means of the adhesive on the bottom face of the base paper 20 being stuck on the top face of the object 30. Alternatively, the decal structure can also be tightly sewn onto the object by means of stitches 24 extending through the base paper 20 outward of the transparent outer layer 23 and through the object 30 without the possibility of easily detaching from the object 30.

Although the present invention has been described with a certain degree of particularity, it is to be understood that the present disclose has been made by way of example only and that many other possible modifications and variations can be made without departing from the scope and spirit of the present invention.

I claim:

1. A method for making a decal structure comprising the steps of:

(a) providing a base paper having a top face and a bottom face;

(b) printing a pattern on the top face of the base paper;

(c) providing a looped spacing polymeric coating, having a first surface tension, on the top face of the base paper around the pattern, said looped spacing polymeric coating having a closed loop inner edge and an outer edge, said inner edge bounding a deposit area;

(d) cutting the base paper into a dimension slightly greater than that of the looped spacing polymeric coating beyond said outer edge thereof;

(e) depositing a polyester, having a second tension greater than the first surface tension, onto said base paper within said deposit area bound by said closed loop inner edge of said looped spacing polymeric coating so as to form a transparent outer layer covering the pattern within said looped spacing polymeric coating, wherein the surface tensions allow said polyester to be retained substantially within said deposit area; and, (f) cooling the polyester to cure so as to form a final decal structure.

2. The method as claimed in claim 1, wherein the bottom face of the base paper is coated with an adhesive.

3. The method as claimed in claim 1, wherein the pattern includes a character.

4. The method as claimed in claim 1, wherein the pattern includes a figure.

5. The method as claimed in claim 1, wherein in the step (c), the looped spacing polymeric coating includes silicon mixed with one percent of a curing agent.

\* \* \* \* \*